(12) United States Patent
Koerber et al.

(10) Patent No.: US 9,873,078 B2
(45) Date of Patent: Jan. 23, 2018

(54) OXYGEN SEPARATOR AND METHOD OF GENERATING OXYGEN

(71) Applicant: KONINKLIJKE PHILIPS N.V., Eindhoven (NL)

(72) Inventors: Achim Gerhard Rolf Koerber, Eindhoven (NL); Rainer Hilbig, Aachen (DE); Paul Van Der Sluis, Eindhoven (NL)

(73) Assignee: KONINKLIJKE PHILIPS N.V, Eindhoven (NL)

( * ) Notice: Subject to any disclaimer, the term of this patent is extended or adjusted under 35 U.S.C. 154(b) by 84 days.

(21) Appl. No.: 14/766,779

(22) PCT Filed: Feb. 15, 2014

(86) PCT No.: PCT/IB2014/059011
§ 371 (c)(1),
(2) Date: Aug. 10, 2015

(87) PCT Pub. No.: WO2014/125446
PCT Pub. Date: Aug. 21, 2014

(65) Prior Publication Data
US 2016/0001216 A1 Jan. 7, 2016

Related U.S. Application Data

(60) Provisional application No. 61/765,217, filed on Feb. 15, 2013.

(51) Int. Cl.
*B01D 53/02* (2006.01)
*B01D 53/047* (2006.01)
(Continued)

(52) U.S. Cl.
CPC .......... *B01D 53/047* (2013.01); *B01D 53/30* (2013.01); *C01B 13/0259* (2013.01);
(Continued)

(58) Field of Classification Search
CPC .......... B01D 2256/12; B01D 2257/102; B01D 2259/40009; B01D 2259/402;
(Continued)

(56) References Cited

U.S. PATENT DOCUMENTS 5,071,453 A 12/1991 Hradek
5,163,978 A 11/1992 Leavitt
(Continued)

FOREIGN PATENT DOCUMENTS

CN 1071346 A 4/1993
CN 1660468 A 8/2005
(Continued)

*Primary Examiner* — Christopher P Jones
(74) *Attorney, Agent, or Firm* — Michael W. Haas

(57) ABSTRACT

The invention relates to an oxygen separator (10), comprising at least one oxygen separation device (12, 14) comprising an oxygen separation sorbent (16, 18) for separating oxygen from an oxygen comprising gas, wherein the oxygen separation device (12, 14) comprises a gas inlet (24, 28) at a primary side being connected to an inlet conduct (20) for guiding a flow of oxygen comprising gas into the oxygen separation device (12, 14) and having a gas outlet (34, 36) at a secondary side being connected to an outlet conduct (30, 32) for guiding a flow of oxygen enriched gas out of the oxygen separation device (12, 14), wherein the secondary side of the oxygen separation device (12, 14) is further connected to a source of purging gas for guiding purging gas through the oxygen separation device (12, 14) and wherein the primary side of the oxygen separation device (12, 14) is connected to an exhaust conduct (70, 72) for guiding exhaust gas out of the oxygen separator (10), wherein the oxygen separator (10) further comprises a pressure adjusting device (40) for creating a pressure difference between the primary side and the secondary side of the oxygen separation device (12, 14), and wherein a gas sensor (82) is provided in the exhaust conduct (70, 72, 73) for determining the concentra- (Continued)

tion of at least one component of the exhaust gas. Such an oxygen separator (10) provides an improved controlling behavior. The invention further relates to a method of generating oxygen from an oxygen comprising gas.

16 Claims, 2 Drawing Sheets

(51) Int. Cl.
 *B01D 53/30* (2006.01)
 *C01B 13/02* (2006.01)
(52) U.S. Cl.
 CPC .... *B01D 2256/12* (2013.01); *B01D 2257/102* (2013.01); *B01D 2259/402* (2013.01); *B01D 2259/40009* (2013.01); *B01D 2259/4533* (2013.01)
(58) Field of Classification Search
 CPC .......... B01D 2259/4533; B01D 53/047; B01D 53/30; C01B 13/0259
 See application file for complete search history.

(56) References Cited

U.S. PATENT DOCUMENTS

| | | |
|---|---|---|
| 5,490,871 A | 2/1996 | Coates |
| 5,529,607 A | 6/1996 | Tan |
| 7,329,304 B2 | 2/2008 | Bliss |
| 7,368,005 B2 | 5/2008 | Bliss |
| 7,753,996 B1 | 7/2010 | Deane |
| 2004/0112211 A1 | 6/2004 | Meirav |
| 2009/0211448 A1 | 8/2009 | McClain |

FOREIGN PATENT DOCUMENTS

| | | |
|---|---|---|
| CN | 1867373 A | 11/2006 |
| CN | 101557866 A | 10/2009 |
| CN | 101861182 A | 10/2010 |
| JP | H03224613 A | 10/1991 |
| JP | H03238017 A | 10/1991 |
| JP | H08257341 A | 10/1996 |
| WO | WO9720616 A1 | 6/1997 |
| WO | WO2012117325 A1 | 9/2012 |
| WO | WO2013164728 A1 | 11/2013 |
| WO | WO2013171628 A1 | 11/2013 |

US 9,873,078 B2

OXYGEN SEPARATOR AND METHOD OF GENERATING OXYGEN

CROSS-REFERENCE TO RELATED APPLICATIONS

This patent application claims the priority benefit under 35 U.S.C. §371 of international patent application no. PCT/IB2014/059011, filed Feb. 15, 2014, which claims the priority benefit under 35 U.S.C. §119(e) of U.S. Provisional Application No. 61/ 765,217, filed on Feb. 15, 2013, the contents of which are herein incorporated by reference.

FIELD OF THE INVENTION

The invention relates to the field of oxygen separation. More specifically, the invention relates to oxygen separation using pressure swing adsorption for therapeutic applications, particularly in the field of home care.

BACKGROUND OF THE INVENTION

Oxygen therapy is the administration of oxygen as a therapeutic modality. It is widely used for a variety of purposes in both chronic and acute patient care as it is essential for cell metabolism, and in turn, tissue oxygenation is essential for all physiological functions. Oxygen therapy should be used to benefit the patient by increasing the supply of oxygen to the lungs and thereby increasing the availability of oxygen to the body tissues, especially when the patient is suffering from hypoxia and/or hypoxemia. Oxygen therapy may be used both in applications in hospital or in home care. The main home care application of oxygen therapy is for patients with severe chronic obstructive pulmonary disease (COPD).

Oxygen may be administered in a number of ways. A preferable way of oxygen administration is by using a so called on demand generation of oxygen. Referring to this, commercial solutions, so-called oxygen concentrators or separators, respectively, are widely known. These oxygen concentrators mostly separate oxygen from an oxygen comprising gas, so that the oxygen is provided on demand, i.e. directly before use.

Known from U.S. Pat. No. 7,329,304 B2 is a portable oxygen concentrator and in detail a portable pressure swing adsorption system for concentrating oxygen as well as a method for using such an apparatus. Such an apparatus includes a plurality of sieve beds or tanks, a compressor, a lower or air manifold defining a plurality of passages therein, a storage tank or reservoir, a set of air control valves for creating one or more flow paths through the passages within the air manifold, and an upper or oxygen delivery manifold. Further an oxygen sensor is provided downstream the reservoir. The oxygen sensor may be coupled to a controller and may generate electrical signals proportional to the purity that may be processed by the controller and used to control or change operation of the apparatus.

There is, however, still potential for improving the operating conditions of oxygen separation devices.

SUMMARY OF THE INVENTION

It is an object of the present invention to provide an oxygen separator and a method of separating oxygen from an oxygen comprising gas which is cost-saving to build, easy to perform, and/or which is advantageous with respect to controlling oxygen purity.

This object is achieved by an oxygen separator according to claim 1. This object is furthermore achieved by a method of separating oxygen from an oxygen comprising gas according to claim 7. Preferred embodiments are defined in the dependent claims.

An oxygen separator for generating a flow of oxygen enriched gas, comprises at least one oxygen separation device for separating oxygen from an oxygen comprising gas, wherein the oxygen separation device is connected to an exhaust conduct for guiding exhaust gas out of the oxygen separator, and wherein a gas sensor is provided in the exhaust conduct for determining the concentration of at least one component of the exhaust gas and a control device for controlling the oxygen separator based on data determined by the gas sensor .

The term oxygen separator as used herein may particularly refer to a device which is capable of separating oxygen from an oxygen comprising gas. Consequently, by means of an oxygen separator, starting from an oxygen comprising gas, pure or essentially pure oxygen or at least oxygen enriched gas may be generated.

The term oxygen separation device may particularly refer to the active part of the oxygen separator. It may for example comprise an oxygen separation sorbent which may interact with an oxygen comprising gas, or with defined constituents of the latter, and may thus separate oxygen from the oxygen comprising gas by means of interaction with at least one constituent of the oxygen comprising gas apart from oxygen. Consequently, the oxygen separation device as such, or its oxygen separation sorbent, respectively, is capable of separating oxygen from an oxygen comprising gas particularly by sorption processes, such as adsorption processes. It may thus be designed as an adsorber bed.

Furthermore, the term primary side of the oxygen separation device, as used herein, may refer to the side or the part of the oxygen separation device being directed towards the direction, at which the oxygen comprising gas is guided to the oxygen separation device, whereas the term secondary side of the oxygen separation device, as used herein, may refer to the side or the part of the oxygen separation device being directed towards the opposite side, i.e. to the side at which the generated pure oxygen or oxygen enriched gas is present and guided to the desired application.

Additionally, the term oxygen comprising gas, as used herein, may refer to any gas which at least partly comprises gaseous oxygen, or which consists of oxygen. The term oxygen enriched gas shall thereby particularly mean a gas which has a higher concentration with respect to oxygen compared to the oxygen comprising gas and which may in an extreme case be pure oxygen.

The term pressure adjusting device may refer to any device which is capable of generating a pressure difference between the primary side and the secondary side of the oxygen separation device. It may for example be a gas compression device being connected to the primary side of the oxygen separation device, or a vacuum pump being connected to the secondary side of the oxygen separation device.

An oxygen separation sorbent may furthermore be understood as a material which sorbs and thus adsorbs or absorbs at least one substance from the oxygen comprising gas except oxygen much better than oxygen and thus lets oxygen pass at least in a big amount.

The term purging gas according to the present invention shall further refer to a gas which is usable for purging the oxygen separation device, or its oxygen separation sorbent, respectively, in order to desorb adsorbed substances and thus for regeneration purposes. For example, purging gas may be the oxygen enriched gas being produced by the oxygen separation devices.

The term exhaust gas shall further refer to the gas flowing out of the oxygen separation device in case it is in a purging state. Exhaust gas may thus particularly be "used" purging gas.

In an exemplary embodiment the oxygen separator may comprise at least one oxygen separation device comprising, for example, an oxygen separation sorbent for separating oxygen from an oxygen comprising gas. The oxygen separation device may be equipped with a gas inlet at a primary side being connected to an inlet conduct for guiding a flow of oxygen comprising gas into the oxygen separation device and with a gas outlet at a secondary side being connected to an outlet conduct for guiding a flow of oxygen enriched gas out of the oxygen separation device. The secondary side of the oxygen separation device may further be connected to a source of purging gas for guiding purging gas through the oxygen separation device and the primary side of the oxygen separation device may be connected to an exhaust conduct for guiding exhaust gas out of the oxygen separator. Apart from that, the oxygen separator may further comprise a gas conveying device for generating a flow of oxygen comprising gas into the oxygen separation device and for generating a flow of oxygen enriched gas out of the oxygen separation device. For example, the gas conveying device may in an example be a pressure adjusting device for creating a pressure difference between the primary side and the secondary side of the oxygen separation device.

An oxygen separator like described above provides improved oxygen separation purity and a more effective and faster controlling regarding adjustment to altering operation conditions.

In order to achieve this, an oxygen separator like defined above comprises at least one oxygen separation device. It may thus comprise only one oxygen separation device or a plurality of more than one oxygen separation devices. For example, the oxygen separation device may comprise two oxygen separation devices and may thus generally form a pressure swing adsorption system (PSA system). However, the oxygen separator may as well form a vacuum swing adsorption system (VSA) or a vacuum pressure swing adsorption system (VPSA).

For separation purposes and in an exemplary embodiment, an oxygen separation device comprises, or is filled with, respectively, an oxygen separation sorbent for separating oxygen from an oxygen comprising gas. Thus, the oxygen separation device may form a sieve bed. The oxygen separation sorbent is thereby capable of separating oxygen from an oxygen comprising by sorbing at least one component of the oxygen comprising gas apart from oxygen or at least better than oxygen. This feature is in accordance with the general setup of a pressure swing adsorption system according to which a separation sorbent interacts with at least one component of the oxygen comprising gas with the exception of oxygen or better than oxygen and thus lets oxygen pass. This feature allows for at least temporarily immobilizing one or more components of the oxygen comprising gas resulting in a separation of oxygen from further components of the oxygen comprising gas. For example, the oxygen separation sorbent may be designed for adsorbing nitrogen but does less or not interact with oxygen in order to let the oxygen pass through and to generate a flow of pure or essentially pure oxygen, or of oxygen enriched gas, respectively, when guiding a flow of oxygen comprising gas, such as particularly air, through the latter.

Non limiting examples for oxygen separation sorbents include zeolites, such as sodium or lithium zeolites, for example the sorbent material being purchasable under its name SXSDM from the firm CECA.

In order to guide oxygen comprising gas to the oxygen separation device, the oxygen separation device, especially each oxygen separation device present, comprises a gas inlet at a primary side being connected to an inlet conduct for guiding a flow of oxygen comprising gas into the oxygen separation device and having a gas outlet at a secondary side being connected to an outlet conduct for guiding a flow of oxygen enriched gas out of the oxygen separation device.

The gas flow, in particular the flow of oxygen comprising gas into the oxygen separation device and the flow of oxygen enriched gas out of the oxygen separation device may thereby be reached by providing a gas conveying device such as a pressure adjusting device which creates a pressure difference between the primary side and the secondary side of the oxygen separation device. The pressure adjusting device may for example be a compressor being positioned on the primary side of the oxygen separation device, and/or it may be formed as a vacuum pump being positioned on the secondary side of the oxygen separation device.

Next to creating a pressure difference between the primary and the secondary side of the oxygen separation device, the pressure adjusting device may thus be useful for conveying the oxygen comprising gas from a source of oxygen comprising gas to the gas inlet, through the oxygen separation device and the generated oxygen through the outlet conduct to a user. This step is especially performed in case the oxygen separation device generates oxygen and is thus in an oxygen separation mode, or in a feed mode, respectively.

It is however known for oxygen separation devices, and their oxygen separation sorbents, respectively, that after a certain time of usage, the sorbent material has to be regenerated in order to desorb the sorbed materials, such as particularly nitrogen. Therefore, it is known to operate the oxygen separator, or the oxygen separation device, respectively, in a purge mode by conveying a purging gas through the oxygen separation device. Therefore, the secondary side of the oxygen separation device, for example the gas outlet of the oxygen separation device, is preferably connected to a source of purging gas for guiding purging gas through the oxygen separation device, and the primary side of the oxygen separation device, for example the gas inlet of the oxygen separation device, is preferably connected to an exhaust conduct for guiding exhaust gas out of the oxygen separator.

An oxygen separator thus separates an oxygen comprising gas such as air essentially into nitrogen and oxygen in a cyclic mode of operation. In a first phase of the cycle the oxygen comprising gas is fed as "inflow" into the oxygen separation device at a higher pressure feed, nitrogen is kept such as adsorbed within this device and pure oxygen is collected as outflowing "product". In a second phase of the cycle the separation device is regenerated, i.e. a purge gas such as a part of the produced oxygen enriched gas, for example, is fed back into the device at a lower pressure purge and the previously adsorbed nitrogen is released as "exhaust" into the surrounding atmosphere. For example at least two separation devices filled with suitable selectively oxygen separation sorbent are used: while one device is in the "feed" phase producing oxygen enriched gas at higher pressure, the other device, being in the "purge" phase at lower pressure, is regenerated with part of the oxygen flow produced by the first device, for example. After a certain time respectively arranged valves are switched and both devices change their role.

A well-known requirement of using oxygen separators is the adaptation of the process to varying process conditions, such as ambient temperature, actual demand of oxygen flow and/or status of the individual separation devices. Therefore, oxygen concentrators may be controlled by an electronic unit preferably comprising a microcontroller.

Inventors have surprisingly found that by providing a gas sensor in the exhaust conduct for determining the concentration of at least one particularly gaseous component of the exhaust gas, the controlling of the oxygen separator and thus the purity and quality of the oxygen enriched gas generated may significantly be enhanced.

In detail, an oxygen separator like described above may enable to estimate the flow rates and the oxygen concentrations—averaged over a strictly limited number of phases of the cycle—in all flows, i.e. in "inflow", "product flow" and "exhaust flow". In this way a total oxygen balance can be made up. With such an oxygen balance it is easily possible to calculate the rate with which the total amount of oxygen contained in the separation device is decreasing or increasing with time. This change rate of the total amount of "stored" oxygen is an important diagnostics to control the separation process, i.e. to minimize the needed power input, to avoid "breakthrough" of the nitrogen front into the "product" stream and/or to avoid fluctuations of the oxygen purity of the product. Furthermore, this diagnostics is much faster requiring a time resolution of a limited number of process cycles than other process diagnostics for example based on the oxygen content of the product flow only, since these diagnostic methods usually have reaction times in the order of several or even tens of process cycles. The diagnostics of the oxygen storage in the oxygen separation device thereby becomes possible due to the fact that even though the respective oxygen separation sorbents are designed for interacting with nitrogen and let oxygen pass, for example, a specific amount of oxygen is anyhow stored in the oxygen separation sieve and is thus detectable.

The concentration of the gas in the exhaust flow of an oxygen separator is thus a more sensitive and faster measure to control the oxygen separator and thus for example to achieve or to hold a demanded oxygen purity compared to sensing the gas concentration, or oxygen purity, respectively, at the product flow. A controlling may for example be performed by a controlling device which is suitable for adjusting the flow rates of respective gas streams, for adjusting the time scale of the feed phase and the purge phase, for adjusting the pressure difference between primary and secondary side, and for further measures.

Further, due to an improved and more effective controlling, an oxygen separator like described above may provide a significant improved reliability. This is due to the fact that even in case conditions appear potentially decreasing the quality of the oxygen enriched gas, or even just change the quality resulting in a less defined product stream, this may be compensated by a quick and effective controlling. The oxygen separator thus ensures an improved separation behavior even after long times of usage.

The above described improved controlling may thereby be realized without further energy consumption so that the oxygen separator like described above is further very energy saving.

An oxygen separator, or oxygen concentrator, respectively like described above thus provides improved controlling of the generated oxygen enriched gas and thus an improved reliability. Such an oxygen separator may particularly be used for medical applications such as home care applications especially due to the fact that especially for homecare applications, where no specially trained users are present, and further for medical applications a high reliability and improved oxygen purity is of significant advantage.

According to an embodiment the gas sensor is an oxygen sensor or a nitrogen sensor. Regarding the provision of an oxygen sensor, a very easy and direct analysis of the measurement results may be achieved. Further, this embodiment directly allows generating data corresponding to the compound of which information is desired, i.e. oxygen. Negative influences potentially affecting the analysis of the measurement results leading to decreased quality of the measurements may be prevented. Regarding the use of a nitrogen sensor, this may be advantageous due to the fact that the concentration of nitrogen is comparably high, for example, in case air is used as oxygen comprising gas.

According to a further embodiment at least one further meter is provided in an inlet conduct or in an outlet conduct. For example, such a meter may be a gas sensor or a flow meter or the like. According to this embodiment, the controlling of the oxygen separator may be conducted even more effective and precise. In detail by combining a meter in an exhaust conduct together with a gas sensor in an inlet conduct and/or in the outlet conduct, not only trends or relative changes of the quality of the generated oxygen enriched gas may be determined, but further exact and objective values may be determined. Further, a security benefit may be achieved due to the fact that even in case one gas sensor fails, or provides non-correct data, a general controlling may still be possible by using the further meters, such as gas sensors.

According to a further embodiment the oxygen separator is formed as a portable device. This may be realized, for example, by arranging it into a portable bag or the like being equipped with an energy source, for example. Essentially, according to the invention, portable could mean a fully independent and self-contained embodiment. Such an embodiment in turn means that no connections, such as to a power source or to a source of oxygen comprising gas, are required during use to further components next to the oxygen separator as such. Especially, no connections to stationary elements are required during use and thus during generating oxygen. Such a portable device may have a grip for carrying it or it may be arranged in a carrying device, such as a bag. Especially portable oxygen concentrators are sensitive against influences of operating conditions because of their limited space of the oxygen separation device, or the limited amount of oxygen separation material, respectively. For example, with respect to portable oxygen concentrators, influences such as impurities of the oxygen separation material, altering working temperatures and the like may under circumstances quickly lead to decreased oxygen selectivity, for example. Consequently, the oxygen separator according to the invention is especially advantageous for portable devices or for devices comprising a small oxygen separation device and/or a limited amount of oxygen separation material.

According to a further embodiment the gas sensor comprises an optical sensor. Such an optical sensor, for example optical oxygen sensor, may be usable for detecting gases, such as oxygen, in a very exact manner thus allowing a very flexible and precise controlling. Further, these types of gas sensors allow a very fast measurement thus allowing the controlling to be as well very dynamic. According to this, the quality such as the oxygen concentration of the generated oxygen comprising gas may as well be improved against a plurality of further sensors. As a further advantage, an optical sensor may be tailored to the desired application as it may be designed for the desired concentration range and may thus provide especially exact measuring results. Apart from that, optical sensors may generally be used in liquids as well as in gases resulting in a very stable behavior as far as contaminations are concerned. As a result, especially an optical gas sensor may provide the advantages of high precision, high reliability, low power consumption, low cross-sensitivity and fast response timed. As an exemplary and non-limiting example, an optical sensor may be selective for oxygen and may be formed from, or may comprise, a device like the "FireSting O2" Fiber-Optic Oxygen Meter being purchasable from the company Pyro Science GmbH. This optical sensor, for example, is based on luminescence quenching by O2-interaction.

According to a further embodiment, the control device comprises an input unit for manually controlling the oxygen separator. According to this embodiment, the data determined by the gas sensor and/or the further meters and for example provided for a user by means of a display may be used for the user to control the oxygen separator manually. Therefore, the user may control via the input device adjust the flow rates of respective gas streams, adjust the time scale of the feed phase and the purge phase, adjust the pressure difference between primary and secondary side, and further measures.

According to a further embodiment a control unit may be provided being connected to at least one of the gas sensor and the at least one further meter and may be designed for controlling the oxygen separator based on the data provided by the at least one gas sensor. The control unit may be the sole control device or it may be present in addition to the above described input unit. According to this embodiment, the control unit may be provided with the data of the gas sensor and/or the further meters and thus with the data of the gas sensor being provided in the exhaust conduct and, in case they are present, with data of further meters such as exemplarily a gas senor being provided in the product conduct, or outlet conduct, respectively and/or in the inlet conduct. The control unit may then automatically control the working of the oxygen separator like described above, for example based on stored protocols, or control instructions, respectively. This allows a self contained controlling of the oxygen separator always providing, inter alia, the best possible quality of the oxygen enriched gas and the less possible energy consumption.

With respect to further advantages and technical features of the oxygen separator it is referred to the description of the method of generating oxygen, the figures and the description of the figures.

The present invention further refers to a method of separating oxygen from an oxygen comprising gas, the method comprising the steps of: performing an oxygen separation step, wherein the oxygen separation step comprises guiding an oxygen comprising gas to the primary side of an oxygen separation device, and generating a flow of oxygen through the oxygen separation device by creating a pressure difference between the primary side and the secondary side of the oxygen separation device; purging the oxygen separation device before or after the oxygen separation step by guiding a purging gas through the oxygen separation device from its secondary side to its primary side and by guiding exhaust gas through the exhaust conduct; determining the concentration of at least one component in the exhaust conduct; and controlling the oxygen separator based on the determined concentration of at least one component in the exhaust conduct.

A method like described above allows the controlling of the oxygen separator and thus the purity and quality of the oxygen enriched gas generated or the energy consumption, for example, to be significantly enhanced. Thereby, such a method provides a more sensitive and faster measure to achieve or to hold a demanded oxygen purity compared to sensing the gas concentration, or oxygen purity, respectively, at the product flow.

In detail, by providing a measure like described above, a total oxygen balance can be made up. With such an oxygen balance it is easily possible to calculate the rate with which the total amount of oxygen contained in the separation device is decreasing or increasing with time. This change rate of the total amount of "stored" oxygen is an important diagnostics to control the separation process, i.e. to minimize the needed power input, to avoid "breakthrough" of the nitrogen front into the "product" stream and/or to avoid fluctuations of the oxygen purity of the product.

Therefore, according to a first step, an oxygen separation step is performed, wherein the oxygen separation step comprises guiding an oxygen comprising gas to the primary side of an oxygen separation device, and generating a flow of oxygen through the oxygen separation device by creating a pressure difference, for example by a compressor or by a vacuum pump. This step thus corresponds to a generally known oxygen separation step using an oxygen separator in which an oxygen comprising gas is guided into an oxygen separation device in which further constituents apart from oxygen are sorbed to an oxygen separation sorbent and oxygen is guided out of the oxygen separation device and further to a user.

In order to desorb sorbed substances from an oxygen separation device, or its oxygen separation sorbent, respectively, the oxygen separation device is purged before or after the oxygen separation step by guiding a purging gas through the oxygen separation device, and by guiding exhaust gas through the exhaust conduct. This regeneration step may as well be performed by a gas conveying device such as a compressor or a vacuum pump and is thus a conventional step known from pressure swing adsorption systems, for example.

In order to secure a defined gas quality of the oxygen enriched gas, the concentration of at least one component and particularly of at least one gas in the exhaust conduct is determined. Further, the oxygen separator is controlled based on that determined concentration such as gas concentration. Consequently, the respective gas concentration is used for determining an oxygen balance, for example, in order to determine of the oxygen separator works in an intended mode or of the process is deteriorated particularly by influences, such as temperature and the like. As a result, the oxygen separator is controlled in an improved manner allowing an improved quality of the generated oxygen enriched gas thereby requiring a significantly reduced amount of time for such a controlling.

According to an embodiment the oxygen concentration or the nitrogen concentration is determined in the exhaust conduct. Regarding the measurement of an oxygen concentration, a very easy and direct analysis of the measurement results may be achieved. Further, this embodiment directly allows generating data corresponding to the compound of which information is desired, i.e. oxygen. Negative influences potentially affecting the analysis of the measurement results leading to decreased quality of the results may be prevented.

According to a further embodiment the gas concentration of at least one component in the exhaust conduct is measured and averaged over one purge phase. This allows a very dynamic controlling of the oxygen separator due to the fact that the controlling is based on the measurement results of one purge phase only. As a result, negative influences deteriorating the quality of the oxygen enriched gas may directly be determined allowing a very effective controlling before significant quality decreased may be provided. This further allows a significant security benefit especially in case the oxygen separator is used for medical applications, for example in the field of homecare. This embodiment thereby becomes possible mainly due to the determination of a gas concentration in the exhaust gas.

According to a further embodiment it is determined if the oxygen separation device is in a cyclic steady state for controlling the oxygen separator. This is a very effective measure for controlling the oxygen separator having standard conditions and thus already without an error occurring. The cyclic steady state may be understood as a situation at which the change of the amount of oxygen stored in the oxygen separation sorbent is constant. This is the desired operation of an oxygen separator and may be described as $dv_{O2}/dt=0$. In fact, an oxygen separation device firstly may have a phase at which the amount of oxygen stored in the oxygen separation devices rises after which a cyclic steady state is reached. Further, a phase may follow at which the amount of oxygen stored falls. Dependent on the status of the oxygen separation device, controlling may be advantageous. The determination of the present status of the oxygen separation device thereby allows a broad variety of controlling.

With respect to further advantages and technical features of the method of generating oxygen it is referred to the description of the oxygen separator, the figures and the description of the figures.

BRIEF DESCRIPTION OF THE DRAWINGS

These and other aspects of the invention will be apparent from and elucidated with reference to the embodiments described hereinafter.

In the drawings.

DETAILED DESCRIPTION OF EMBODIMENTS

Figure 1:
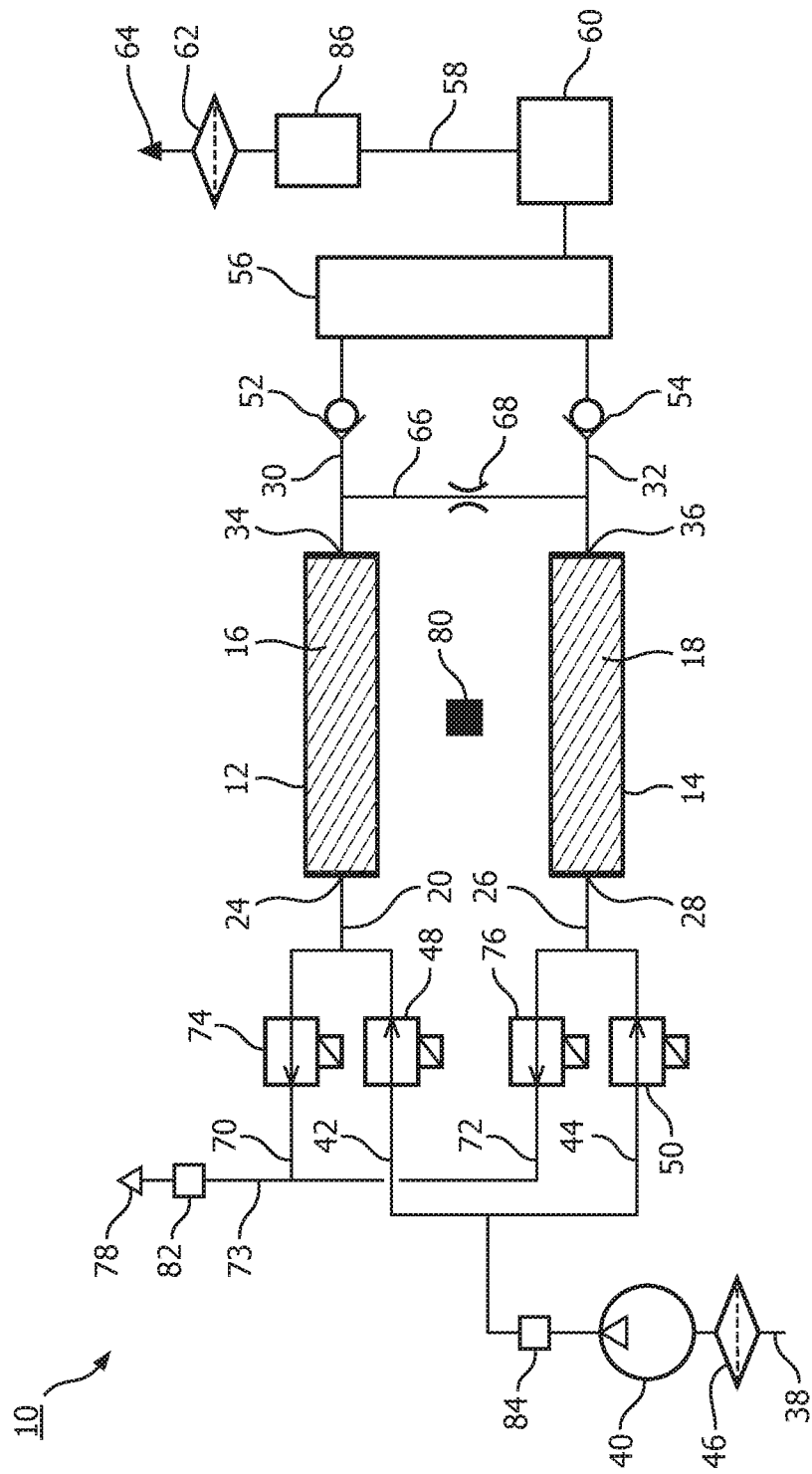
FIG. 1 shows a schematic view of an embodiment of an oxygen separator according to the invention.

In FIG. 1, an exemplary embodiment of an oxygen separator 10 for generating oxygen is schematically shown. The oxygen separator 10 may be used for generating oxygen with respect to therapeutic applications, for example in the field of COPD treatment. The oxygen separator 10 may be designed as a stationary arrangement, for example for using it in a hospital, or it may be a portable device, for example for using it in the field of homecare applications. However, the oxygen separator 10 may furthermore be used for any application at which pure or essentially pure oxygen has to be provided, for example in air planes or for welding purposes. Such an oxygen concentrator, or oxygen separator 10, respectively, may be based on an oxygen concentrator such as the one called SimplyGo and which is purchasable from Philips Respironics.

The oxygen separator 10 according to FIG. 1 comprises at least one oxygen separation device 12 which is capable of separating oxygen from an oxygen comprising gas. However, it is preferred that the oxygen separator 10 comprises at least two oxygen separation devices 12, 14 being arranged in parallel. In the following, the invention is described with respect to two oxygen separation devices 12, 14. However, it is clear for one skilled in the art that every feature may be provided correspondingly by using just one oxygen separation device 12 or more than two oxygen separation devices 12, 14. Each oxygen separation device 12, 14 may be formed as a sieve bed and may be equipped with an oxygen separation sorbent 16, 18. The oxygen separation sorbent 16, 18 is particularly configured for letting oxygen pass without significantly impeding its flow, but for interacting with, or adsorbing, respectively other components being present in an oxygen comprising gas. In case air is used as oxygen comprising gas, it is thus preferred that the oxygen separation sorbent 16, 18 is configured for adsorbing nitrogen. Suitable oxygen separation sorbents 16, 18 may comprises a zeolite material such as a lithium zeolite material. However it may be possible to use every suitable oxygen separation sorbent 16, 18 known in the art, for example for use in for swing processes, such as pressure swing adsorption ore vacuum swing adsorption processes.

An inlet conduct 20 is provided for guiding a flow of oxygen comprising gas to the gas inlet 24 of the oxygen separation device 12 at its primary side. Correspondingly, an inlet conduct 26 is provided for guiding a flow of oxygen comprising gas to the gas inlet 28 of the oxygen separation device 14 at its primary side, respectively. Furthermore, outlet conducts 30, 32 for guiding oxygen enriched gas, or pure oxygen, respectively, out of the oxygen separation devices 12, 14 are connected to gas outlets 34, 36 of the respective oxygen separation device 12, 14.

The inlet conducts 24, 26 of the oxygen separation devices 12, 14 are connected to an inlet 38 of the oxygen separator 10. Connected to the inlet 38 is a source of oxygen comprising gas, such as a gas storing device or the air surrounding the oxygen separator 10. Additionally, a pressure adjusting device 40 for creating a pressure difference between the primary side and the secondary side of the oxygen separation device 12, 14 may be provided. According to FIG. 1, the pressure adjusting device 40 is formed as a compressor for compressing the oxygen comprising gas and forcing it through the inlet conducts 42, 44, which may be part of or connected to the inlet conducts 24, 26, to the oxygen separation devices 12, 14. Thus, according to the present invention, the expression an inlet conduct shall mean one, several or all of these inlet conducts 42, 44, 24, 26. Downstream or upstream the pressure adjusting device 40, an inlet filter 46 may be provided in order to provide a first cleaning step of the oxygen comprising gas. In detail, especially solid particles may be filtered out of the oxygen comprising gas.

In order to allow the oxygen comprising gas to be guided through the oxygen separation devices 12, 14 intermittently, inlet valves 48, 50 may be provided in the inlet conducts 42, 44. A valve according to the invention shall be any device which may allow a gas flow, inhibit a gas flow and/or regulate the amount of a gas flow. Consequently, by closing the valve 50 and by opening the valve 48, the oxygen comprising gas may be guided through the first oxygen separation device 12, whereas the oxygen comprising gas may be guided through the second oxygen separation device 14 by opening the valve 50 and by closing the valve 48. Correspondingly, a valve 52, such as a check valve, may be provided in the outlet conduct 30 and a valve 54, such as a check valve, may be provided in the outlet conduct 32. By guiding the oxygen comprising gas through the first oxygen separation device 12, the valve 52 may be opened whereas the valve 54 may be closed. Correspondingly, by guiding the oxygen comprising gas through the second oxygen separation device 14, the valve 54 may be opened whereas the valve 52 may be closed.

Downstream the valves 52, 54, the outlet conducts 30, 32 are connected to an oxygen accumulator 56, or a gas tank, respectively, in order to store the generated oxygen. The oxygen accumulator 56 may be connected to an outlet conduct 58 in which a flow controller 60 may be provided in order to control a stream of pure oxygen. Thus, according to the present invention, the expression an outlet conduct shall mean one, several or all of these outlet conducts 58, 30, 32. Furthermore, an additional filter 62 may be provided in the outlet conduct 58 before the generated oxygen is guided to an outlet 64. From the outlet 64, the generated oxygen enriched gas may be guided to the desired application, such as to a patient.

The outlet conduct 30 of the first oxygen separation device 12 and the outlet conduct 32 of the second oxygen separation device 14 may be connected by a cross conduct 66 upstream the valves 52, 54, in which a flow regulator 68, such as an orifice or a flow controller, may be provided. This allows guiding a defined part of the generated oxygen, for example generated in the oxygen separation device 12, 14, back through the further oxygen separation device 14, 12, or vice versa, for purging purposes and thus for regenerating the oxygen separation devices 12, 14. Alternatively, the secondary side of the oxygen separation devices 12, 14 may be connected to a further source of purge gas, such as a tank comprising oxygen with a high purity, for example, for guiding the purge gas through the oxygen separation devices 12, 14, respectively. With this regard, exhaust conducts 70, 72 are provided at the primary sides of the oxygen separation devices 12, 14, each comprising a valve 74, 76. If purge gas, such as oxygen enriched gas, is guided through the oxygen separation devices 12, 14, from their secondary side to their primary side for regeneration purposes, the outflow may then be guided selectively through the exhaust conducts 70, 72. Further, the exhaust conducts 70, 72 may be guided each to an outlet or they may be combined to one common exhaust conduct 73 and may thus be guided to one common exhaust 78.

Furthermore, a heating device 80 for heating the oxygen separation device 12, 14 may be provided. The heating device 80 may act on the whole oxygen separation device 12, 14 or may only heat special regions for regeneration purposes. In general, every heating device 80 known in the art may be used. For example, heating coils may be provided.

In addition, a gas sensor 82, such as an oxygen sensor or a nitrogen sensor, for example an optical sensor, is provided in the exhaust conduct 73 for determining the concentration of at least one component of the exhaust gas. It may be preferred that a gas sensor 82 is positioned in the common exhaust conduct 73, like shown in FIG. 1, or a respective gas sensor may additionally or alternatively be positioned in the exhaust conduct 70 of the first oxygen separation device 12 and/or in the exhaust conduct 72 of the second oxygen separation device 14. Moreover and next to the gas sensor 82 positioned in one or more exhaust conducts 70, 72, 73, a meter 84, such as an oxygen sensor or a nitrogen sensor or a flow meter may be positioned in one or more inlet conducts 42, 44, and a meter 86, such as an oxygen sensor or a nitrogen sensor or a flow meter may be positioned in one or more outlet conducts 30, 32, 58, or product conducts, respectively. For controlling the oxygen separator 10 based on the data provided by the at least one of the gas sensor 82 and/or the further meters 84, 86, a control device such as an automatically working control unit and/or an input unit for manually controlling the oxygen separator may be provided being connected to at least one of the gas sensor 82 and the further meters 84, 86. The controlling of the oxygen separator is described with respect to the following figures.

Figure 2:
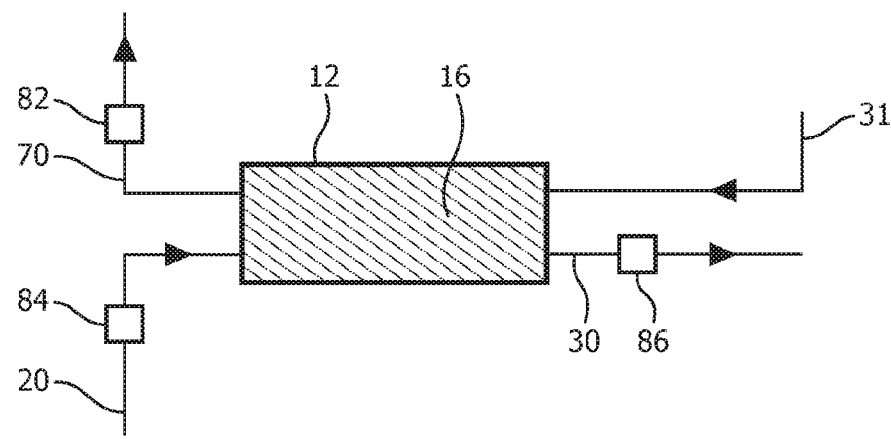
FIG. 2 shows a simplified view of a part of a further embodiment of an oxygen separator according to the invention.

FIG. 2 shows a simplified view of a part of an oxygen separator 10 according to the invention. In detail, in FIG. 2, in an exemplary and non limiting manner, the oxygen separation device 12 with its oxygen separation sorbent 16 is shown. The oxygen separation device 12 again is connected at its primary side to the inlet conduct 20 and the exhaust conduct 70, according to this embodiment having different connection points, and at its secondary side to the outlet conduct 30 and to a further purging line 31. By providing a gas sensor 82 in the exhaust conduct 70 and potentially a meter 84 in the inlet conduct 44 and a meter 86 in the outlet conduct 30, a total oxygen balance may be calculated allowing a precise controlling of the oxygen separator 10, and thus of the length of the feed periods and purge periods, of the flow rates of the respective gas streams, of the purity of the oxygen comprising gas etc.

An oxygen separator 10 like described above may enable to estimate, or to determine, respectively, the flow rates and the oxygen concentrations—averaged over a strictly limited number of phases of the cycle, such as one half cycle and thus one purge phase,—in all flows, i.e. in "inflow", "product flow" and "exhaust flow". In this way a total oxygen balance can be made up. With such an oxygen balance it is easily possible to calculate, for example, a general tendency as well as the absolute rate with which the total amount of oxygen contained in the separation device is decreasing or increasing with time.

For the example that meters 84 and 86 are gas sensors, this can be realized by assuming that the sum of the oxygen in the inflow and thus in the flow of the oxygen comprising gas being directed to the oxygen separation device 12 during a feed phase and being determined by the gas sensor 84, of the product flow and thus of the flow of the oxygen enriched gas leaving the oxygen separation device 12 during a feed phase and being determined by the gas sensor 86, and of the exhaust flow and thus of the exhaust gas flowing out of the oxygen separation device 12 during a purge flow and being determined by the gas sensor 82, is constant at least in a steady state. This can be measured by the respective gas sensor 82 and the further meters 84, 86, wherein, according to the invention, a gas sensor generally may be understood as a qualitative and further potentially quantitative measuring device of the respective gas, or gas streams, respectively. The above may be clarified by the following equation: $\Phi_{in} yO_{2in} = \Phi_{pro} yO_{2pro} + \Phi_{ex} yO_{2ex} + dv_{O2}/dt$, wherein $\Phi_{in}$ corresponds to the flow rate of the oxygen comprising gas, $yO_{2in}$ corresponds to the oxygen concentration of the oxygen comprising gas, $\Phi_{pro}$ corresponds to the flow rate of the oxygen enriched gas (product gas), $yO_{2pro}$ corresponds to the oxygen concentration of the oxygen enriched gas (product gas), $\Phi_{ex}$ corresponds to the flow rate of the exhaust gas, $yO_{2ex}$ corresponds to the oxygen concentration of the exhaust gas, and $dvb_{O2}/dt$ corresponds to the change of the amount of oxygen stored in the oxygen separation device 12, or its oxygen separation sorbent 16, respectively. The desired operation of an oxygen separator 10 may be the situation at which the cyclic steady state is reached and thus when $dv_{O2}/dt=0$. In case the oxygen concentration in the exhaust flow is measured, such as for example averaged over half a cycle, or the purge phase, respectively, it can directly be determined, if the oxygen separation device works in such a cyclic steady state, or if this preferred state is lost and measures have to be taken accordingly. This can be visualized by the following equation describing the oxygen concentration in the exhaust flow of the cyclic steady state:

$$yO_{2exCSS}=[\Phi_{in}yO_{2in}-\Phi_{pro}yO_{2pro}]/\Phi_{in}-\Phi_{pro}$$

As a result, by determining the oxygen concentration in the exhaust conduct 70, for example with 0.1% accuracy and using the equation $\Delta yO2_{ex}=yO_{2ex}-yO_{2exCSS}$ as indicator for the sieve status, the state of the oxygen separation device may directly be determined. This may be performed qualitatively by solely measuring the oxygen concentration in the exhaust gas or quantitatively by additionally examining the further gases like described above.

By knowing the oxygen concentration in the exhaust, an estimation of the flow rate and the oxygen concentration delivered to the user can thus indirectly be calculated. It is possible to infer the total oxygen balance. By knowing this oxygen balance, it is possible to proceed to the diagnostic of much faster. This is due to the fact that the purity in the product flow changes very slow due to the "buffer" volume of the oxygen separation device 12.

Figure 3:
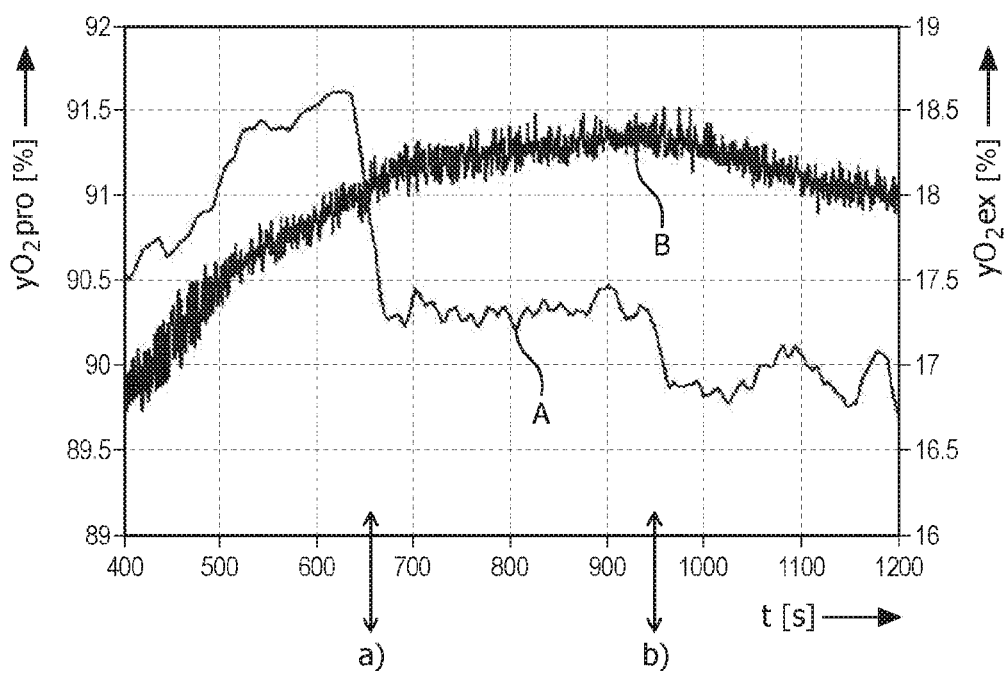
FIG. 3 shows a schematic diagram indicating the effect of a changing feed phase to the oxygen concentration in the exhaust conduct and in the outlet conduct.

FIG. 3 further shows a relative evaluation of the state of the oxygen separation device 14. In detail, in FIG. 3, the oxygen concentration of the exhaust gas $yO_{2ex}$, shown as curve A, is shown, together with the oxygen concentration of the oxygen enriched gas (product gas) $yO_{2pro}$ as curve B, against the time. It can be seen that by changing distinct parameters of the oxygen separator 10, a change of the state of the oxygen separation device 12 can be seen by determining the oxygen concentration of the exhaust gas $yO_{2ex}$ much faster than by determining the oxygen concentration of the oxygen enriched gas (product gas) $yO_{2pro}$. In detail, the diagram in FIG. 3 shows the effect to the respective oxygen concentrations in case the feed phase was changed from 2.5 s to 3.5 s at 650 s (point a)) and from 3.5 s to 4.0 s at 950 s (point b)). It can clearly be seen that the oxygen concentration in the exhaust gas directly indicates such a change, whereas the oxygen concentration in the product gas or oxygen enriched gas, respectively, is much slower and significantly less sensitive in indicating such a change in oxygen separation conditions. Thus it is possible to determine very quickly if, for example, the oxygen separation device 12 works in a cyclic steady state, or has an increasing or decreasing amount of oxygen storage in which case controlling may be triggered in order to improve the oxygen separation results. This example is thereby especially useful for determining trends or tendencies, respectively, of the oxygen separation device 12 and further clearly demonstrates the very fast controlling being possible by a method and an oxygen separator according to the invention.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. An oxygen separator for generating a flow of oxygen-enriched gas, comprising:
   at least one oxygen separation device for separating oxygen from a gas mixture, the oxygen separation device including an oxygen separation sorbent; and an inlet conduct, the gas mixture including the oxygen and at least one other component;
   a first meter in the inlet conduct of the oxygen separation device configured to guide a flow of the gas mixture;
   an exhaust conduct configured to guide exhaust gas out of the oxygen separation device, the exhaust gas including used pure gas;
   a gas sensor in the exhaust conduct configured to determine an average concentration of at least one conponent of the exhaust gas over at least one purge phase of the oxygen separation device; and
   a control device configured by control instructions to:
      determine whether the oxygen separation device is operating in a cyclic steady state based on (i) the flow of gas mixture guided by the first meter and (ii) the average concentration of the at least one component of the exhaust gas, wherein the cyclic steady state operation is indicative of a constant change in an amount of oxygen stored in the oxygen separation sorbent; and
      control the oxygen separator based on the determination of cyclic steady state operation.

2. The oxygen separator according to claim 1, wherein the gas sensor is an oxygen sensor or a nitrogen sensor.

3. The oxygen separator according to claim 1, further compromising
   a second meter, including in an outlet conduct of the oxygen separation device and configured to guide the flow of oxygen enriched gas, wherein the gas mixture is guided into the oxygen separation device at a first side, and the oxygen enriched gas is guided out of the oxygen separation device at a second side, the second side being opposite the first side of the oxygen separation device.

4. The oxygen separator according to claim 1, wherein the oxygen separator is formed as a portable device.

5. The oxygen separator according to claim 1, wherein the gas sensor comprises an optical sensor.

6. The oxygen separator according to claim 1, wherein the control device comprises an input unit for manually controlling the oxygen separator.

7. The oxygen separator according to claim 3, wherein the control device communicates with at least one of the gas sensor, the first meter, and the second meter, and controls the oxygen separator based on the data provided by at least one of the gas sensor, the first meter, and the second meter.

8. The oxygen separator of claim 1, further comprising an inlet filter included in the inlet conduct of the oxygen separation device and configured to filter the gas mixture input to the oxygen separation device.

9. The oxygen separator of claim 1, further comprising an outlet filter included in an outlet conduct of the oxygen separation device and configured to filter the generated oxygen enriched gas.

10. A method for generating a flow of oxygen-enriched gas, comprising:
- guiding, via a first meter in an inlet conduct of an oxygen separation device, a flow of a gas mixture, the gas mixture including oxygen and at least one other component;
- guiding, via an exhaust conduct, exhaust gas out of the oxygen separation device;
- determining, by a gas sensor, in the exhaust conduct, an average concentration of at least one component of the exhaust gas over at least one purge phase of the oxygen separate device;
- determining, by a control device, whether the oxygen separation device is operating in a cyclic steady state based on (i) the flow of the gas mixture guided by the first meter and (ii) the average concentration of the at least one component of the exhaust gas, wherein the cyclic steady state operation is indicative of a constant change in an amount of oxygen stored in an oxygen separation sorbent; and
- controlling, by the control device, the oxygen separation device based on the determination of cyclic steady state operation.

11. The method of claim 10, wherein the gas sensor is an oxygen sensor or a nitrogen sensor.

12. The method of claim 10, further comprising
- guiding, via a second meter included in an outlet conduct of the oxygen separation device, the flow of oxygen enriched gas, wherein the gas mixture is guided into the oxygen separation device at a first side, and the oxygen enriched gas is guided out of the oxygen separation device at a second side, the second side being opposite the first side of the oxygen separation device.

13. The method of claim 10, wherein the oxygen separation device is formed as a portable device.

14. The method of claim 10, wherein the gas sensor comprises an optical sensor.

15. The method of claim 12, further comprising
- controlling by the control device, the oxygen separation device based on data received by the control device from at least one of the gas sensor, the first meter, and the second meter.

16. An oxygen separator for generating a flow of oxygen-enriched gas from a gas mixture, comprising:
- at least one oxygen separation device for separating oxygen from the gas mixture, the oxygen separation device including an inlet conduct;
- a first meter in the inlet conduct of the oxygen separation device configured to guide a flow of the gas mixture;
- an exhaust conduct configured to guide exhaust gas out of the oxygen separation device;
- a gas sensor in the exhaust conduct configured to determine an average concentration of at least one component of the exhaust gas over at least one purge phase of the oxygen separation device; and
- a control device configured to:
  - determine whether the oxygen separation device is operating in a cyclic steady state based on (i) the flow of the gas mixture guided by the first meter and (ii) the average concentration of the at least one component of the exhaust gas; and
  - control the oxygen separator based on the determination of cyclic steady state operation.

* * * * *